Jan. 5, 1965
M. L. BASTIAN
3,164,276
BALER FEEDER
Filed May 10, 1963
5 Sheets-Sheet 1
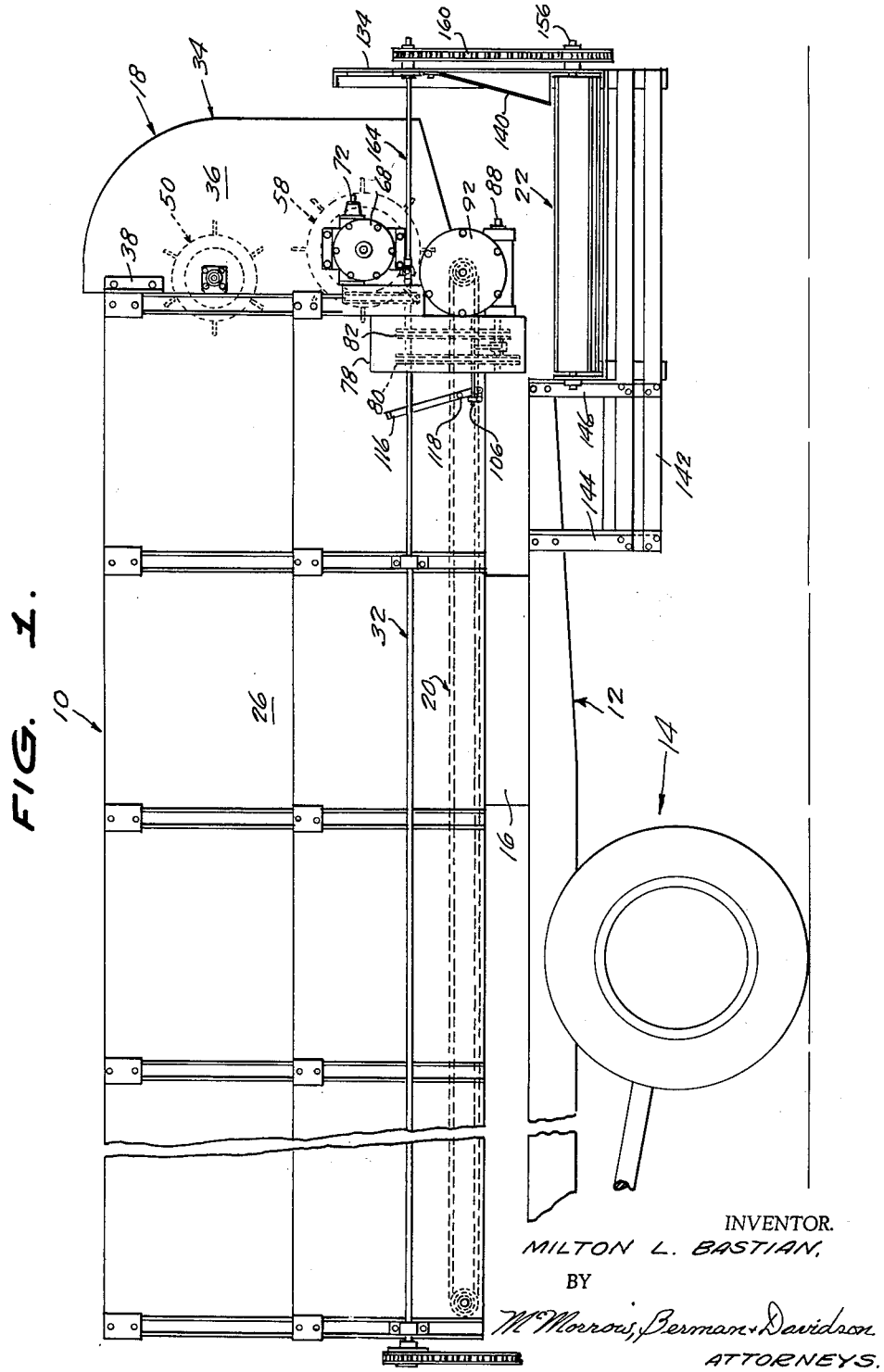
INVENTOR.
MILTON L. BASTIAN,
BY
McMorrow, Berman & Davidson
ATTORNEYS.

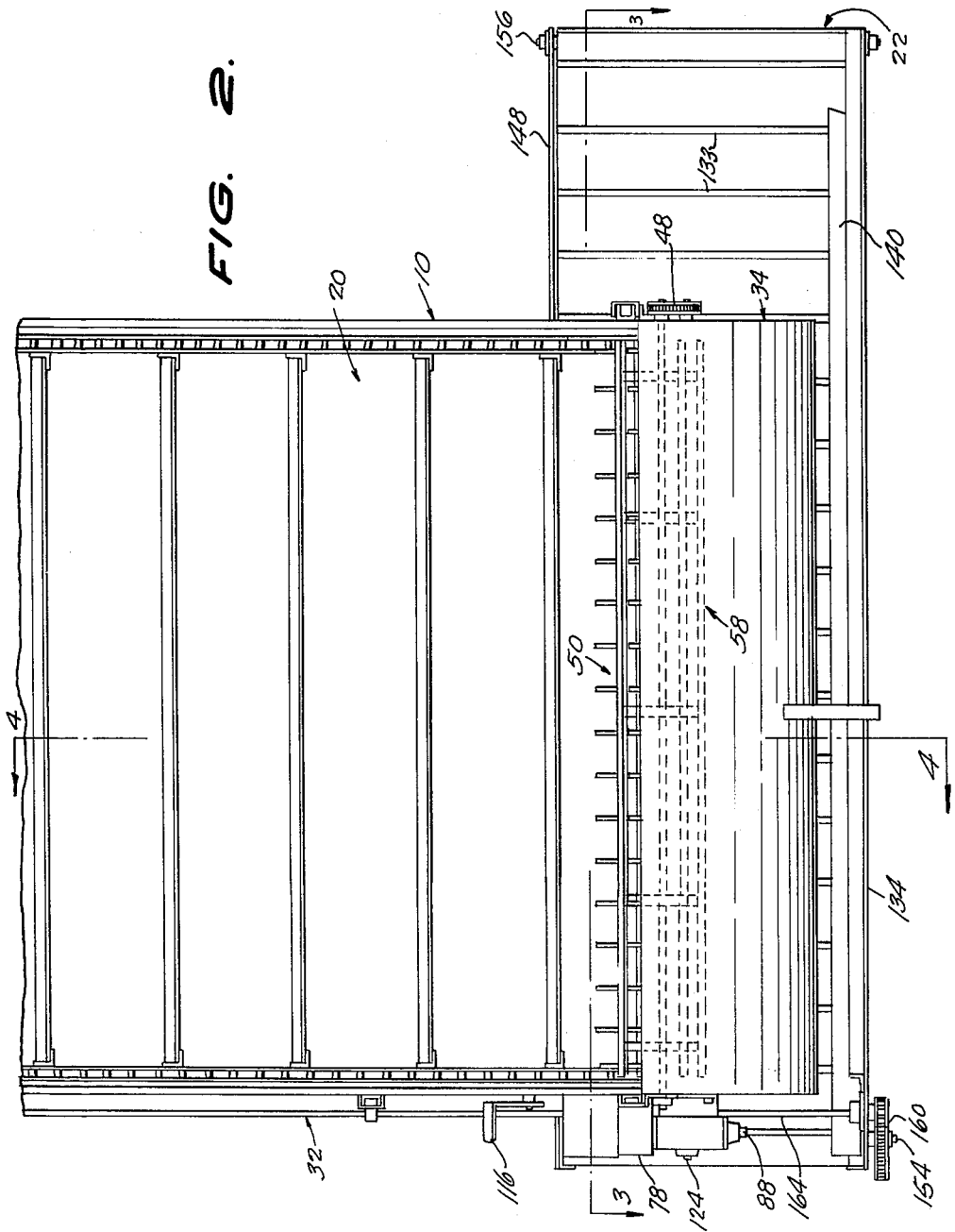

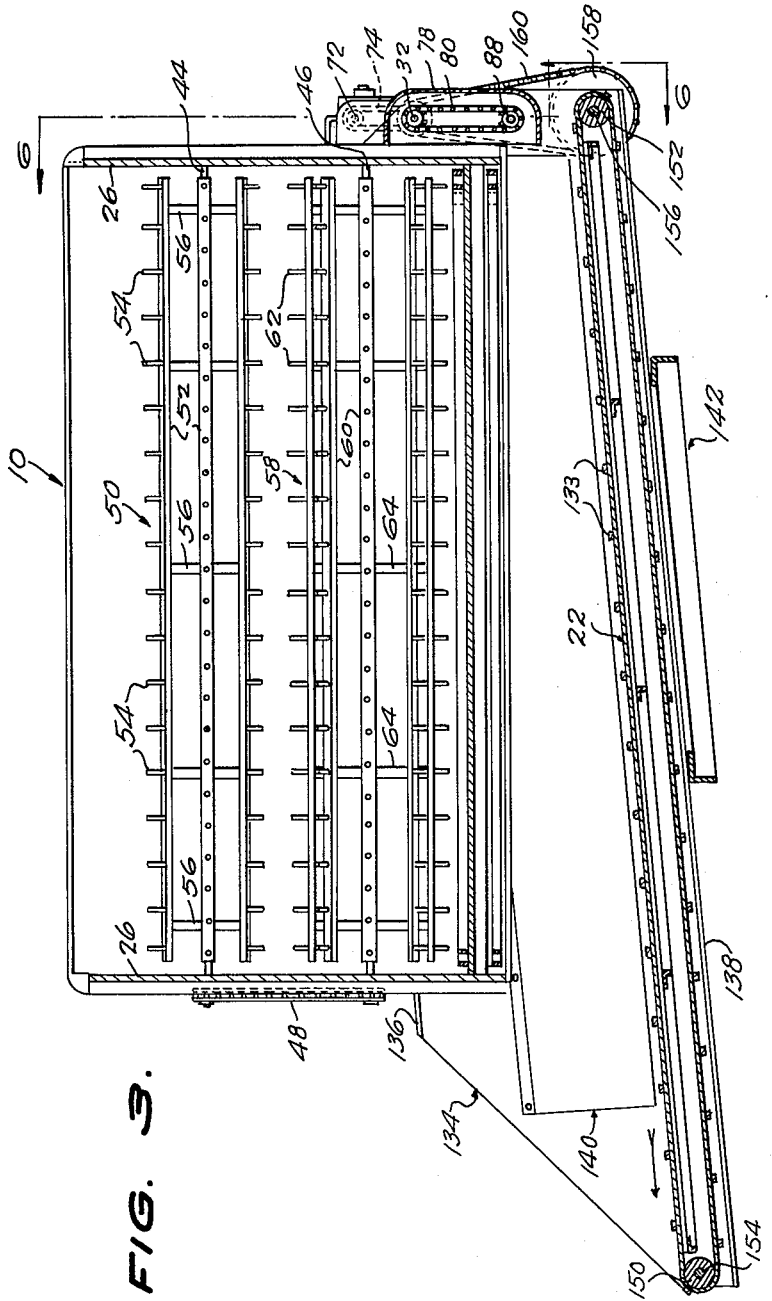

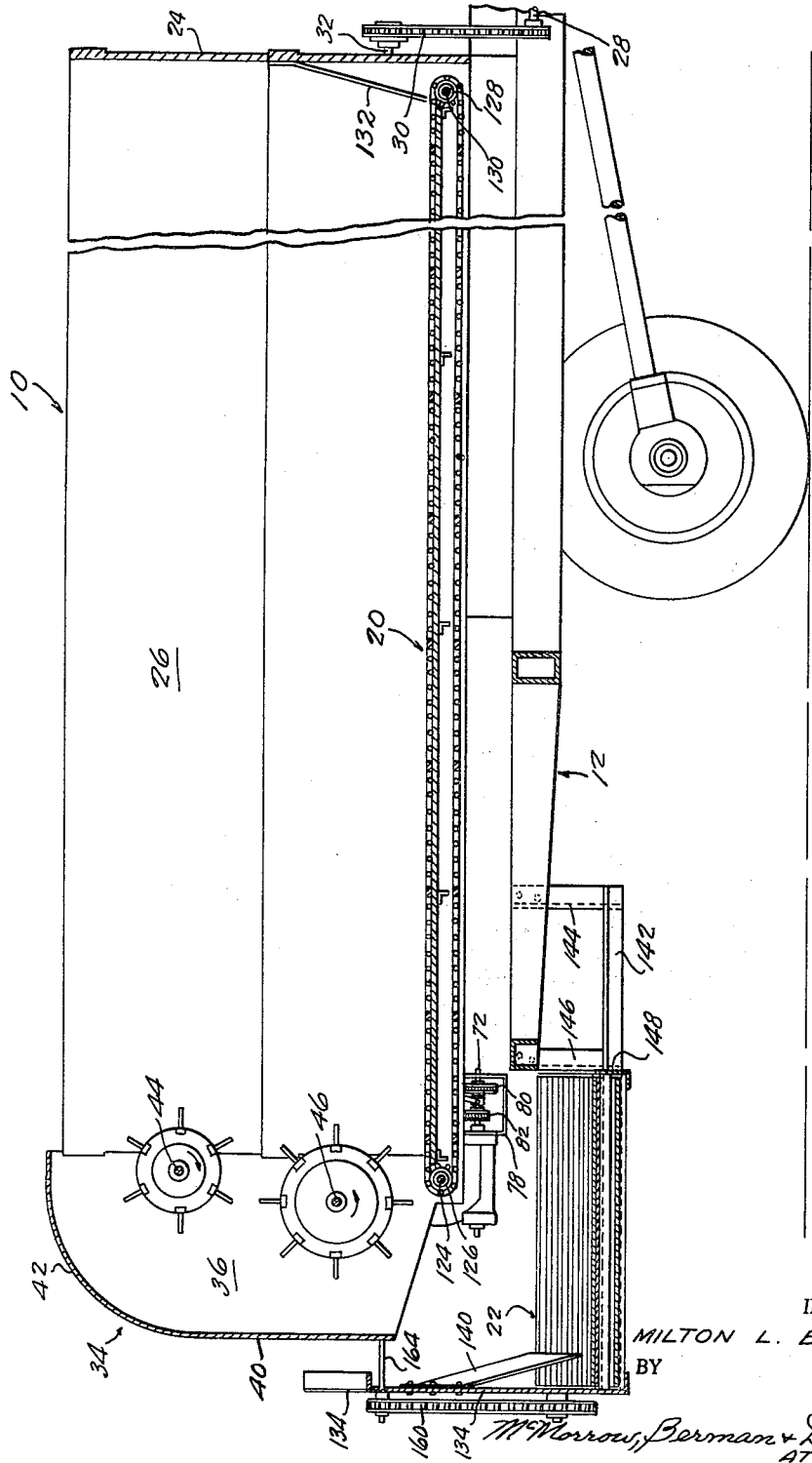

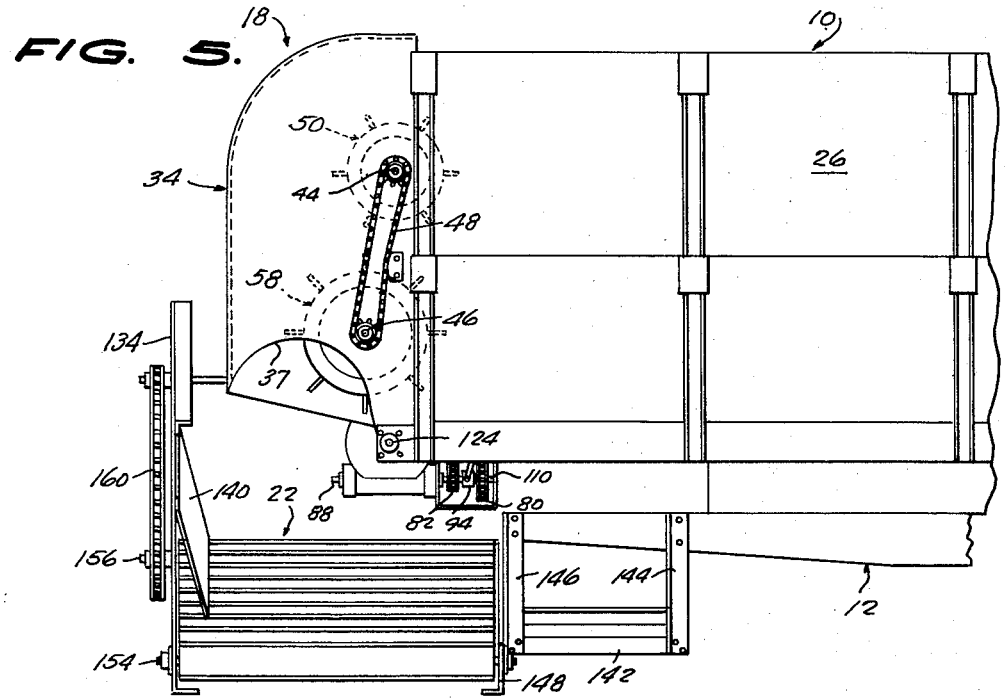
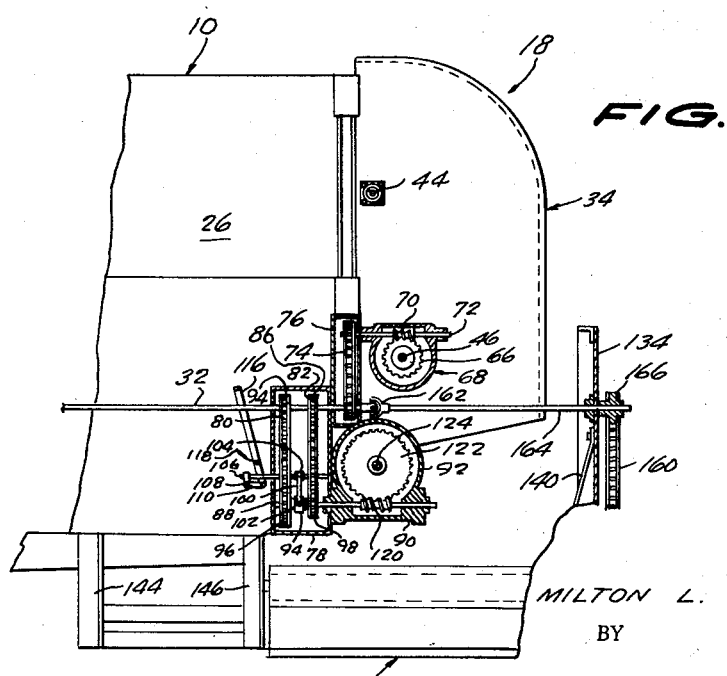
INVENTOR.
MILTON L. BASTIAN,
BY
McMorrow, Berman & Davidson
ATTORNEYS.

3,164,276
BALER FEEDER
Milton L. Bastian, Egbert, Wyoming
Filed May 10, 1963, Ser. No. 279,446
4 Claims. (Cl. 214—519)

This invention relates to a novel feeder for power balers handling hay, straw, and the like.

The primary object of the invention is the provision of an efficient, practical, and time- and labor-saving device of the kind indicated, which eliminates the need for the usual two men for transferring the material to be baled, from a stack or other supply thereof, eliminates uneven feeding to the baler of unmixed material, such as material containing heavy wet clumps or clumps of coarse inferior material, and thereby assures more compact and uniform bales.

Another object of the invention is the provision of a mobile device of the character indicated above, which enables the baling in the field, of unstacked material, so as to eliminate stacking of the material and the leaving of bales all over a field, as in conventional field baling, which then have to be picked up and carried to the place of storage.

A further object of the invention is the provision of a device of the character indicated above, which comprises a truck-mounted box having a rearwardly traveling horizontal floor-level longitudinal conveyor, a power-driven beater assembly mounted on the rear end of the box, to which the said ctnveyor moves the material in the box, and a power-driven canted transverse conveyor onto which the beaten material falls, to be conveyed to the pick-up of a baler.

Other important objects and advantageous features of the invention will be apparent from the following description and the accompanying drawings, wherein, for purposes of illustration only, a specific form of the invention is set forth in detail.

In the drawings:

FIGURE 1 is a contracted left-hand side elevation of a device of the present invention;

FIGURE 2 is an enlarged and fragmentary top plan view of the rear part of the device;

FIGURE 3 is a vertical transverse section taken on the line 3—3 of FIGURE 2.

FIGURE 4 is a vertical longitudinal section taken on the line 4—4 of FIGURE 2;

FIGURE 5 is a fragmentary right-hand side elevation of the device; and,

FIGURE 6 is a fragmentary vertical transverse section takne on the line 6—6 of FIGURE 3, parts being broken away.

Referring in detail to the drawings, wherein like numerals designate like parts throughout the several views, the illustrated device comprises a longitudinally elongated box 10 overlying the chassis frame 12 of a truck 14, and spaced thereabove by suitable means, indicated at 16, and reaching beyond the rear end of the chassis frame. A beater assembly 18 is mounted to and across the open rear end of the box 10, and a longitudinal feeder conveyor, such as floor-level, horizontal endless belt 20, is adapted to move material in the box 10 to the beater assembly 18. Beaten and uniformly mixed material falls from the beater assembly 18 onto a transverse delivery conveyor, such as a slat equipped endless belt 22, which is conted downwardly toward the right and extends beyond the right-hand side of the box 10, with its lower end spaced above the ground, on a level to discharge into the pick-up of a baler (not shown).

The box 10 has a vertical front wall 24, perpendicular side walls 26, and is open, at its rear end. A horizontal drive shaft 28, extending rearwardly from the motor (not shown) of the truck 14 is connected by a sprocket chain 30 to a horizontal driven shaft 32, spaced above the drive shaft 82 and extending inwardly along the outer side of the left-hand box side wall 26 for driving the delivery ocnveyor belt 22, as hereinafter set forth in detail.

The longitudinal conveyor belt 20 is indirectly driven from the driven shaft 32, by components of the beater assembly 18, as hereinafter described in detail.

The beater assembly 18 is of generally conventional type, and involves a box or housing 34 such as is exemplified in Patent No. 3,035,729 to Soares et al., dated May 22, 1962. The housing 34 has parallel spaced vertical side walls 36 aligned with the box side walls 26, which are secured to the rear ends of the latter, as indicated at 38, in FIGURE 1, a perpendicular rear wall 40, and a forwardly and upwardly bowed top wall 42, and is open to the box 10. The lower edge of the right-hand side wall 36 is formed with deep and wide discharge notch 37.

An upper horizontal transverse shaft 44 is journalled through the housing side walls 36, on a level above the mid-height of the housing and close to the rear ends of the box side walls 26, and a lower horizontal transverse shaft 46 is journaled through the housing side walls 36, on a level spaced below and rearwardly relative to the upper shaft 44. The right-hand ends of the shafts 44 and 46 are connected together to run at substantially the same speed and in the same direction, by a sprocket chain 48, at the outer sides of the right-hand box side wall 26.

The upper shaft 44 carries a relatively small diameter drum 50, composed of circumferentially spaced, longitudinal bars 52, having outwardly projecting fingers 54 spaced therealong, and secured to longitudinally sapced cricular webs 56, which are axially traversed by and secured to the upper shaft 44.

The lower shaft 46 carries a relatively large diameter drum which has longitudinal bars 60, fingers 62, and webs 64, like those of the upper drum 50.

The left-hand end of the lower drum shaft 46 has a worm wheel 66 thereon, within a casing 68 fixed, to the outer side of the lef-hand side wall of the beater housing 34, which is in mesh with a worm 70, on a longitudinal horizontal shaft 72, journaled in the casing 68, the forward end of the shaft 72 being connected by a sprocket chain 74 to the driven shaft 32. The chain 74 is enclosed in an upper part 76 of a casing 78.

The casing 78 is traversed by a part of the driven shaft 32, and encloses a relatively long forward sprocket chain 80 and a shorter rear sprocket chain 82, which operatively connect the driven shaft 32, with a relatively large diameter forward sprocket wheel 84, and a smaller rear sprocket wheel 86, respectively. The sprocket wheels 84 and 86 rotate freely on a horizontal longitudinal worm shaft 88, which, as shown in FIGURE 6, is journaled across the lower part of the casing 78 and extends rearwardly therefrom, where the shaft 88 is journaled to the base 90 of another casing 92.

A suitable clutch member 94 slides on the shaft 88, between the sprocket wheels 84 and 86, and is adapted for selective engagement with suitable clutch elements 96 and 98, on the facing sides of the sprocket wheels 84 and 86, respectively, whereby the speed of rotation of the worm shaft 88 can be selected through operative connection of either of these sprocket wheels to the worm shaft. Such connection of the larger forward sprocket wheel 84 drives the worm shaft at a slower speed than such connection of the smaller rear sprocket wheel 86 with the worm shaft.

The clutch member 94 is shifted by means of an upstanding fork 100, pivoted thereto, as indicated at 102, and pivoted, at its upper end, as indicated at 104, to a longitudinal horizontal shift rod 106, which slides through the casing 78. The shift rod 106 has an enlarged head 108, on its forward end, outside of the casing 78 to which a link 110 is pivoted at its forward end, the link being pivoted, at its rear end, to the lower end of a vertical clutch lever 116, which is pivotally mounted, intermediate its ends, as indicated at 118, on the adjacent box side wall 26. As indicated in FIGURE 6, the lever connects the clutch member 94 with the clutch elements of the sprocket wheels 84 and 86, when the lever is moved to extreme rearward and forward positions, respectively, from a middle or neutral position, in which these sprocket wheels are unconnected to the worm shaft 88.

The worm shaft 88 has a worm 120 thereon which is in mesh with a relatively large diameter worm wheel 122, on a transverse horizontal shaft 124, which is journaled through the casing 92, the casing 92 being mounted to the left-hand side wall of the beater housing 34. The shaft 124 has thereon spaced rear sprockets 126, over which the rear end of the longitudinal feeder conveyor belt 20 is operatively trained, the forward end of this belt being trained over sprockets 128 on a forward transverse front shaft 130, which is journaled in the side walls 26 of the box 10, adjacent to the front wall 24 of the box, as shown in FIGURE 4. A downwardly and rearwardly angled feeder plate 132 is secured to the rear side of the front wall, and extends to the top flight of the conveyor 20, behind the forward end of this conveyor.

The transverse conveyor belt 22, which is substantially longer than the width of the box 10, is here shown as being composed of flexible fabric material, provided on its exposed side with longitudinally spaced transverse raddles or slats 134, but can be of other construction, is carried by a framework. The framework comprises a transversely elongated vertical rear wall 134, which extends along the rear side of the belt 22 and has upper and lower reinforcing flanges 136 and 138 extending forwardly from its upper and lower edges, respectively. A forwardly and downwardly angled fender plate 140 is fixed to the forward side of the rear wall 134 and reaches to a level near the top of the belt.

The rear conveyor wall 134 rests upon and is fixed to a support 142 which is fixed to and extends forwardly from longitudinally spaced vertical struts 144 and 146, which are fixed to the chassis frame 12, and located forwardly of the clutch casing 78. A narrower transverse vertical front conveyor wall 148 extends along the front side of the conveyor belt 22 and is fixed to the support 142, and is of the same length as the rear conveyor wall 134.

The delivery belt 22 declines toward the right of the box 10, at a relatively flat angle, and is trained around plain lower and upper drums 150 and 152, respectively, fixed on shafts 154 and 156, respectively, which are journaled through the conveyor walls 134 and 148, at related ends thereof. The upper drum shaft 156 has an enlarged diameter sprocket wheel 158, on its rear end, over which is trained an upwardly extending sprocket chain in 160.

As shown in FIGURE 1, the driven shaft 32 is connected, at its rear end, by a universal joint 162, to the forward end of a jack shaft 164, which is journaled through the upper part of the rear conveyor wall 134, at its elevated or left-hand end, and has a small diameter sprocket wheel 166, on its rear end, over which the chain 160 is trained.

In operation, when the driven shaft 32 is rotated, the longitudinal or feeder belt is moved rearwardly whereby material present in the box 10, such as hay or straw, is moved rearwardly to and between the drums of the beater assembly, where the material is pulled apart and worked so that any clumps are broken up and the material is mixed so as to obtain a uniform mixture of differing components of the material, and so as to supply such material to fall out of the open bottom of the beater housing 34 onto the downwardly and laterally moving transverse delivery conveyor belt 22, which is moving at a constant predetermined speed, whereby the material is fed to the pick-up of a baler (not shown) at a uniform and appropriate rate. Where it is desirable to slow down or speed up the rate of feed by the conveyor belt to the beater assembly, this is readily done by operating the clutch lever 116.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A device of the character described, comprising a support, a box secured to the support and having an open end, a beater assembly mounted across said open end, a feeder conveyor extending along the bottom of the box for feeding material to the beater assembly, a delivery conveyor extending transversely of the box beneath the beater assembly and reaching laterally beyond one side of the box and the beater assembly, said delivery conveyor declining toward said one side, and drive means operatively connected to the feeder conveyor, the beater assembly, and the delivery conveyor, said beater assembly comprising a vertical housing having an open bottom and being open to the said one end of the box, upper and lower drums journaled across the beater, housing to which material in the box is fed for deposit upon the delivery conveyor, said box having a front wall and side walls, said drive means comprising a horizontal longitudinal driven shaft supported along one box side wall, said delivery conveyor comprising a rear vertical transverse wall and front vertical transverse wall, support means fixed to the chassis frame and to these walls, a jack shaft journaled through the upper part of the rear wall and connected to the rear end of the driven shaft, said jack shaft extending along said one box wall, said delivery conveyor being located between the front and rear walls and having an elevated end and a depressed end, upper and lower rollers journaled in the front and rear walls over which the delivery belt is trained, the upper roller being operatively connected to the jack shaft at a point between said rear and front walls, the upper and lower drums of the beater assembly being connected to rotate together, first means operatively connected between the driven shaft and the drive shaft, forward and rear sprocket shafts journaled across the interior of the box over which the feeder conveyor is drained, and second means operatively connecting the driven shaft to the rear feeder belt sprocket shaft, said second means comprising change-speed means, and a worm wheel fixed on the rear sprocket shaft of the feeder belt, a longitudinal worm shaft having a worm in mesh with said worm wheel, said worm shaft extending forwardly from the worm wheel, said change-speed means comprising sprocket wheels of different diameters, equal diameter sprocket wheels fixed on the driven shaft, sprocket chains trained over the driven shaft sprocket wheels and the worm shaft sprocket, said worm shaft sprockets having clutch elements on their facing sides, a clutch member slidably and rotatably engaged on the worm shaft between the worm shaft sprockets, and shifting means connected to the clutch member and movable to shift the clutch member from a neutral position into engagement with either of the clutch elements.

2. A device of the character described, comprising a support, a box secured to the support and having an open end, a beater assembly mounted across said open end, a feeder conveyor extending along the bottom of the box for feeding material to the beater assembly, a delivery conveyor extending transversely of the box beneath the beater assembly and reaching laterally beyond one side of the box and the beater assembly, said delivery conveyor declining toward said one side, and drive means operatively connected to the feeder conveyor, the beater assembly, and the delivery conveyor, said beater assembly comprising a vertical housing having an open bottom and being open to the said one end of the box, upper and lower drums journaled across the beater housing to which material in the box is fed for deposit upon the delivery conveyor, said box having a front wall and side walls, said drive means comprising a horizontal longitudinal driven shaft supported along one box side wall, said delivery conveyor comprising a rear vertical transverse wall and a front vertical, transverse wall, support means fixed to the chassis frame and to these walls, a jack shaft journaled through the upper part of the rear wall and connected to the rear end of the driven shaft, said jack shaft extending along said one box wall, said delivery conveyor being located between the front and rear walls and having an elevated end and a depressed end, upper and lower rollers journaled in the front and rear walls over which the delivery belt is trained, the upper roller being operatively connected to the jack shaft at a point between said rear and front walls, the upper and lower drums of the beater assembly being connected to rotate together, first means operatively connected between the driven shaft and the drive shaft, forward and rear sprocket shafts journaled across the interior of the box over which the feeder conveyor is trained, and second means operatively connecting the driven shaft to the rear feeder belt sprocket shaft, said first means comprising a worm wheel fixed on the rear sprocket shaft of the feeder conveyor belt, a worm shaft having a worm in mesh with the worm wheel and extending forwardly therefrom, and means operatively connecting the worm shaft at its forward end to the driven shaft.

3. A device of the character described, comprising a box having a bottom, side walls, and an open front end, a housing mounted on and extending forwardly from said front end, said housing opening into said open front end, said housing having a front wall spaced forwardly from the box and side walls, a closed casing supported beneath said housing, a transverse shaft journaled at its ends in walls of said casing, said transverse shaft having a wormwheel fixed thereon, a longitudinal driven shaft supported on the box and journaled through the housing above the wormwheel, said driven shaft having a worm in mesh with said wormwheel, upper and lower transverse rollers mounted within said housing and operatively connected together, means operatively connecting the driven shaft to the lower roller, a transverse conveyor assembly supported beneath the said casing, said assembly comprising a conveyor belt, upper and lower rotary members carrying said conveyor belt, said driven shaft being operatively connected at its forward end to the upper conveyor belt member, a longitudinal worm shaft supported in mesh with the underside of said wormwheel, and change speed means operatively connected between the worm shaft and said driven shaft.

4. A device according to claim 3, wherein said change speed means is positioned behind said wormwheel.

References Cited by the Examiner
UNITED STATES PATENTS

| | | | |
|---|---|---|---|
| 2,676,002 | 4/54 | Wolfe | 214—519 |
| 2,743,832 | 5/56 | Kappelmann | 214—519 |
| 2,822,946 | 2/58 | Van Drisse | 214—519 |
| 3,035,729 | 5/62 | Soares et al. | 214—519 |
| 3,037,780 | 6/62 | Skromme et al. | 214—519 X |
| 3,069,172 | 12/62 | Beiler | 214—519 X |
| 3,084,821 | 4/63 | Knight | 214—519 |

HUGO O. SCHULZ, *Primary Examiner.*
GERALD M. FORLENZA, *Examiner.*